United States Patent [19]

Reyes

[11] Patent Number: 5,982,448

[45] Date of Patent: Nov. 9, 1999

[54] MULTI-LANGUAGE CLOSED CAPTIONING SYSTEM

[76] Inventor: Frances S. Reyes, 402 67th St., West New York, N.J. 07093

[21] Appl. No.: 08/961,509

[22] Filed: Oct. 30, 1997

[51] Int. Cl.[6] ............................ H04N 5/445; H04N 5/278
[52] U.S. Cl. ........................ 348/552; 348/563; 348/468; 348/589
[58] Field of Search ..................................... 348/563, 564, 348/569, 589, 600, 468, 485, 552; H04N 5/278, 5/445

[56] References Cited

U.S. PATENT DOCUMENTS 5,294,982   3/1994   Salomon ............................... 348/461

*Primary Examiner*—Sherrie Hsia

[57] ABSTRACT

A multi-language closed captioning system is provided including a television having a speaker for transmitting audio signals. The television further has a screen for depicting various images upon receipt of television signals and depicting alphanumeric characters upon the receipt of a sub-carrier channel. A source of closed captioning is adapted to deploy a plurality of sub-carrier channels each for transmitting a string of alphanumeric characters corresponding to audio signals transmitted by the television. Such alphanumeric characters are representative of one of a plurality foreign languages. A selector unit is connected to the television and the source of closed captioning. An array of language buttons is situated on the selector unit and adapted to allow the transmission of one of the sub-carrier channels to the television upon the depression thereof.

5 Claims, 2 Drawing Sheets

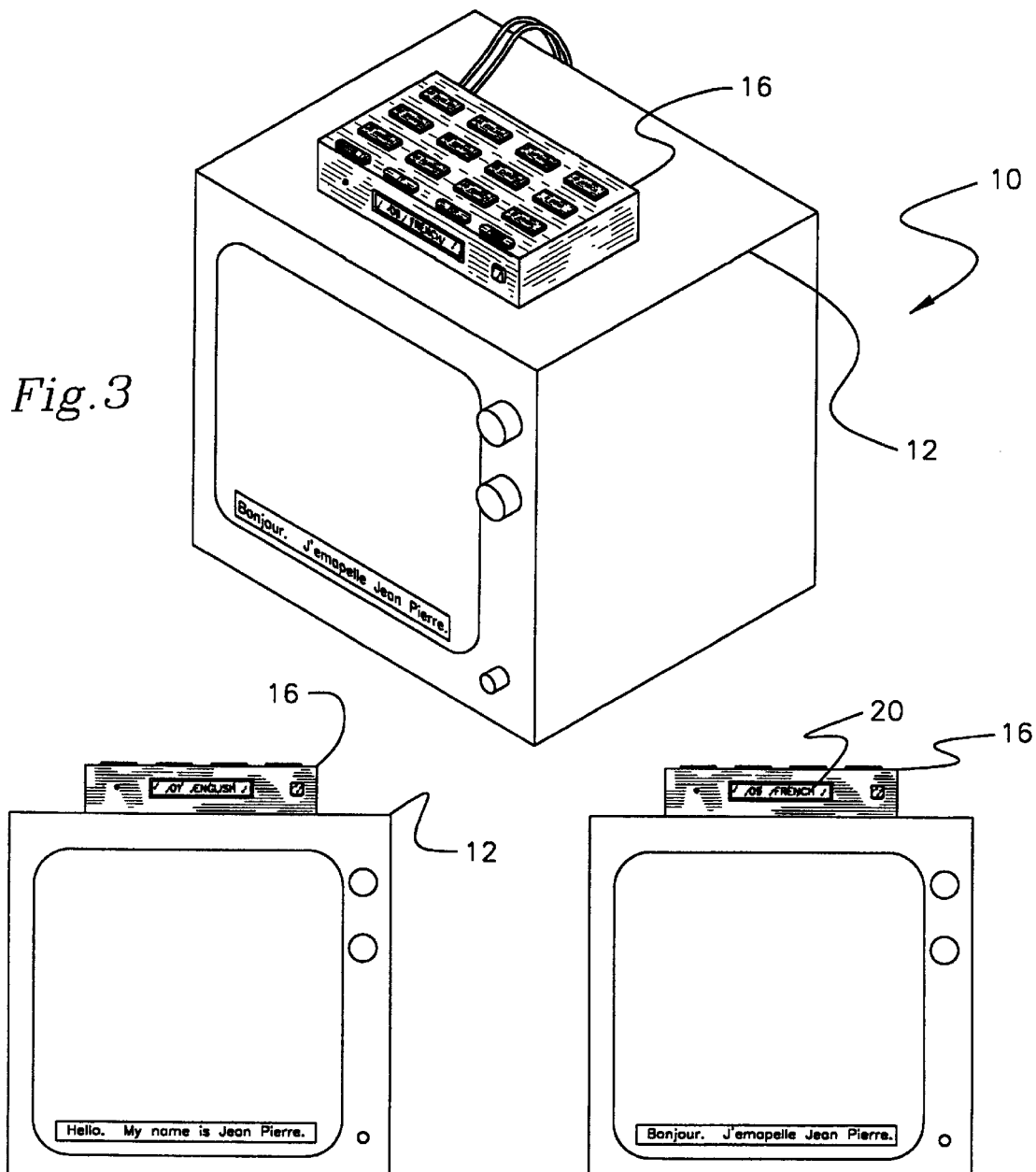

MULTI-LANGUAGE CLOSED CAPTIONING SYSTEM

BACKGROUND OF THE INVENTION

1. Field of the Invention

The present invention relates to closed captioning and more particularly pertains to a new multi-language closed captioning system for providing closed captioning in various languages.

2. Description of the Prior Art

The use of closed captioning is known in the prior art. More specifically, closed captioning heretofore devised and utilized are known to consist basically of familiar, expected and obvious structural configurations, notwithstanding the myriad of designs encompassed by the crowded prior art which have been developed for the fulfillment of countless objectives and requirements.

Known prior art closed captioning include U.S. Pat. No. 5,294,982; U.S. Pat. No. 5,124,694; U.S. Pat. No. 4,698,677; U.S. Pat. No. 4,700,322; U.S. Pat. No. 5,343,239; and U.S. Pat. No. 4,472,830.

In these respects, the multi-language closed captioning system according to the present invention substantially departs from the conventional concepts and designs of the prior art, and in so doing provides an apparatus primarily developed for the purpose of providing closed captioning in various languages.

SUMMARY OF THE INVENTION

In view of the foregoing disadvantages inherent in the known types of closed captioning now present in the prior art, the present invention provides a new multi-language closed captioning system construction wherein the same can be utilized for providing closed captioning in various languages.

The general purpose of the present invention, which will be described subsequently in greater detail, is to provide a new multi-language closed captioning system apparatus and method which has many of the advantages of the closed captioning mentioned heretofore and many novel features that result in a new multi-language closed captioning system which is not anticipated, rendered obvious, suggested, or even implied by any of the prior art closed captioning, either alone or in any combination thereof.

To attain this, the present invention generally comprises a television having a speaker for transmitting audio signals and a screen for depicting various images upon receipt of television signals. The screen is further adapted to depict alphanumeric characters upon the receipt of a sub-carrier channel with such characters being carried thereby. Next provided is an unillustrated remote source of closed captioning adapted to deploy a plurality of sub-carrier channels. The remote source of closed captioning serves to transmit a string of alphanumeric characters corresponding to audio signals transmitted by the television. It should be noted that the alphanumeric characters of each channel are representative of one of a plurality foreign languages. Shown in the Figures is a selector unit having a rectilinear configuration with a top rectangular face, a bottom rectangular face, and a periphery formed therebetween defining an interior space. The periphery is defined by a long rectangular front face, a long rectangular rear face, and a pair of short rectangular side faces. During use, the selector unit is connected to the television, the source of closed captioning, a digital source of television signals, a magnetic tape source of television signals, and a free space source of television signals. As best shown in FIG. 1, an array of language buttons are situated on the top face of the selector unit and have indicia representative of one of a plurality foreign languages. Each button is adapted to allow the transmission of one of the sub-carrier channels to the television upon the depression thereof. As such, the language associated with the sub-carrier channel corresponds with the language represented by the indicia on the depressed button. Finally, a display is positioned on the front face of the selector unit for depicting the indicia associated with the language button last depressed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-language closed captioning system apparatus and method which has many of the advantages of the closed captioning mentioned heretofore and many novel features that result in a new multi-language closed captioning system which is not anticipated, rendered obvious, suggested, or even implied by any of the prior art closed captioning, either alone or in any combination thereof.

It is another object of the present invention to provide a new multi-language closed captioning system which may be easily and efficiently manufactured and marketed.

It is a further object of the present invention to provide a new multi-language closed captioning system which is of a durable and reliable construction.

An even further object of the present invention is to provide a new multi-language closed captioning system which is susceptible of a low cost of manufacture with regard to both materials and labor, and which accordingly is then susceptible of low prices of sale to the consuming public, thereby making such multi-language closed captioning system economically available to the buying public.

Still yet another object of the present invention is to provide a new multi-language closed captioning system which provides in the apparatuses and methods of the prior art some of the advantages thereof, while simultaneously overcoming some of the disadvantages normally associated therewith.

Still another object of the present invention is to provide a new multi-language closed captioning system for providing closed captioning in various languages.

Even still another object of the present invention is to provide a new multi-language closed captioning system that includes a television having a speaker for transmitting audio signals. The television further has a screen for depicting various images upon receipt of television signals and depicting alphanumeric characters upon the receipt of a sub-carrier channel. A source of closed captioning is adapted to deploy a plurality of sub-carrier channels each for transmitting a string of alphanumeric characters corresponding to audio signals transmitted by the television. Such alphanumeric characters are representative of one of a plurality foreign languages. A selector unit is connected to the television and the source of closed captioning. An array of language buttons is situated on the selector unit and adapted to allow the transmission of one of the sub-carrier channels to the television upon the depression thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of the present invention.

FIG. 4a is a front view of the present invention in a first mode.

FIG. 4b is a front view of the present invention in a second mode.

DESCRIPTION OF THE PREFERRED EMBODIMENT

Figure 1:
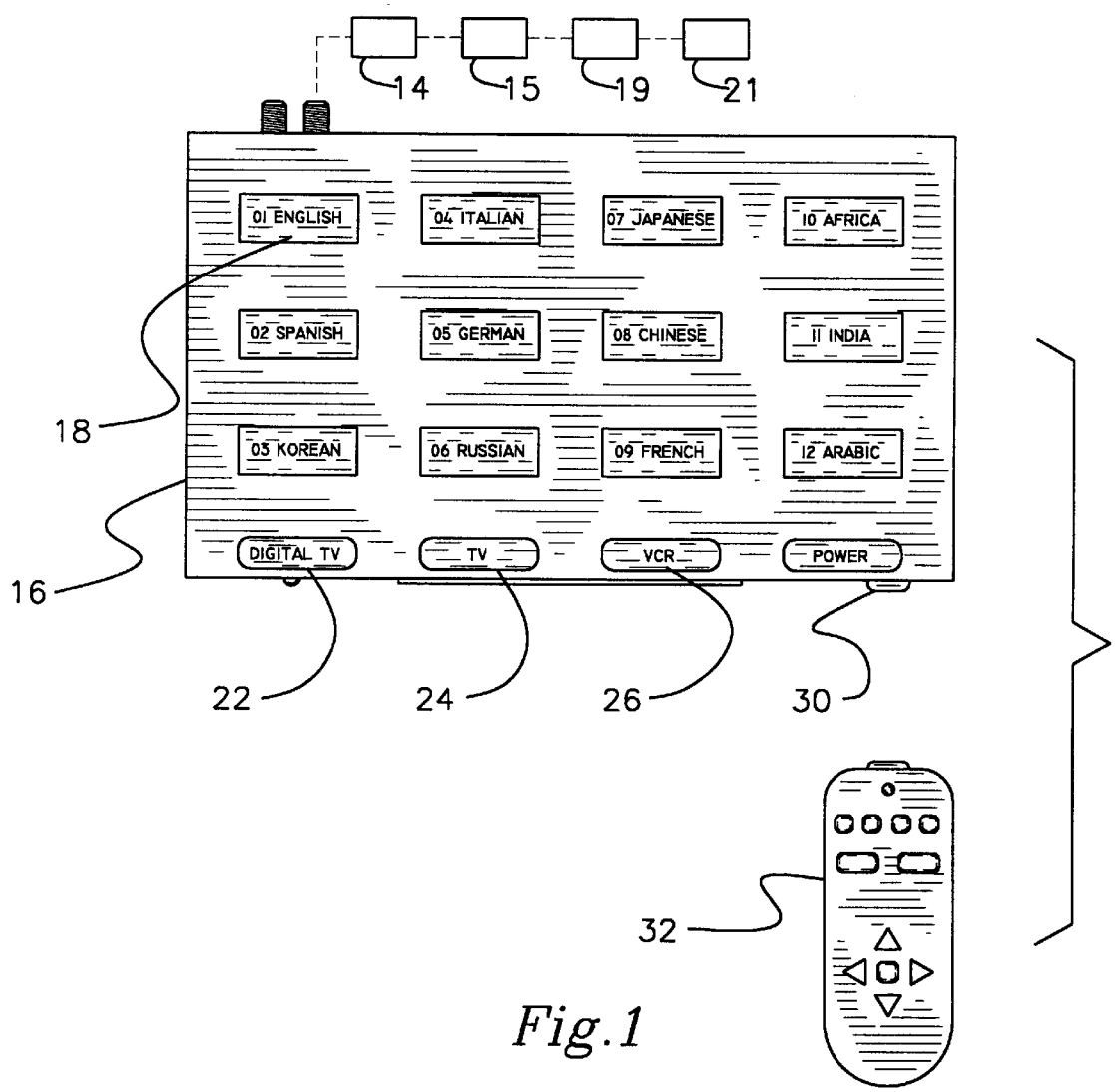
FIG. 1 is a top view of a new multi-language closed captioning system according to the present invention.
Figure 2:
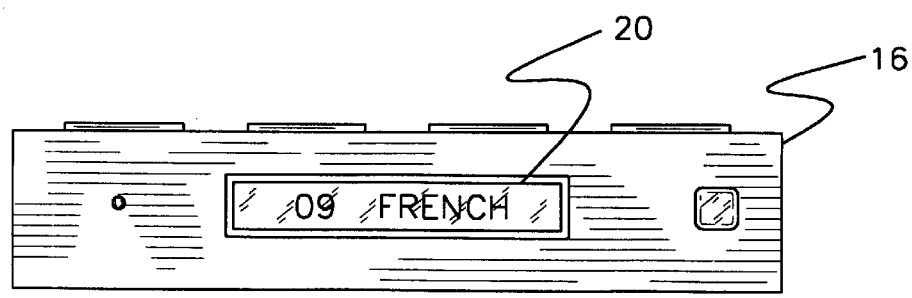
FIG. 2 is a front view of the present invention.

With reference now to the drawings, and in particular to FIGS. 1 through 4b thereof, a new multi-language closed captioning system embodying the principles and concepts of the present invention and generally designated by the reference numeral 10 will be described.

The preset invention, as designated as numeral 10, includes a television 12 having a speaker 13 for transmitting audio signals and a screen for depicting various images upon receipt of television signals. The screen is further adapted to depict alphanumeric characters upon the receipt of a sub-carrier channel with such characters being carried thereby.

Next provided is an remote source 14 of closed captioning adapted to deploy a plurality of sub-carrier channels. The remote source of closed captioning serves to transmit a string of alphanumeric characters corresponding to audio signals transmitted by various sources of television signals. Preferably, sub-carrier channels are included for a vast array of channels receivable from the various sources of television signals. It should be noted that the alphanumeric characters of each channel are representative of one of a plurality foreign languages. In other words, any words spoken or sound made by the visual images has a corresponding written equivalent.

Shown in the Figures is a selector unit 16 having a rectilinear configuration with a top rectangular face, a bottom rectangular face, and a periphery formed therebetween defining an interior space. The periphery is defined by a long rectangular front face. a long rectangular rear face. and a pair of short rectangular side faces. During use, the selector unit is connected to the television, the source of closed captioning, a digital source of television signals 15, a magnetic tape source of television signals(VCR) 19, and a free space source of television signals 21.

As best shown in FIG. 1, an array of language buttons 18 are situated on the top face of the selector unit and each have indicia representative of one of a plurality foreign languages. Such languages include English, Italian, Japanese, African, Spanish, etc. Each button is adapted to allow the transmission of one of the subcarrier channels to the television upon the depression thereof. As such, the language associated with the sub-carrier channel which is sent to the television corresponds with the language represented by the indicia on the depressed button. It should be noted that the television signal channel received from the source of closed captioning is automatically matched with the channel currently received by the source of television signals to ensure that the closed captioning is representative of the audio signals of the currently received television signal.

It should be noted that the selector unit is further programmable to preclude the transmission of selectively predetermined languages and further closed captioning of certain channels. This is to aid the source of closed captioning with billing purposes. As an option, the source of closed captioning may further be equipped with the ability to either display the closed captioning in a scroll-type fashion or by intermittently flashing each line on a line-by-line basis. Such ability would he employed as a function of the speed of dialogue employed in the conversation.

A display 20 is positioned on the front face of the selector unit for depicting the indicia associated with the language button last depressed. Further buttons include a digital TV key 22, a television key 24, and VCR key 26 for determining from which source the television signals are received. A power key 28 and power indicator light 30 are also provided. It should be noted that, as an option, a remote control 32 may be provided with each of the aforementioned buttons to allow use of the present invention from afar.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-language closed captioning system comprising, in combination:

a television having a speaker for transmitting audio signals and a screen for depicting various images upon receipt of television signals and alphanumeric characters upon the receipt of a sub-carrier channel;

a remote source of closed captioning adapted to deploy a plurality of sub-carrier channels each for transmitting a string of alphanumeric characters corresponding to the audio signals transmitted by the television with such alphanumeric characters representative of one of a plurality foreign languages;

a selector unit having a rectilinear configuration with a top rectangular face, a bottom rectangular face, and a periphery formed therebetween defining an interior space, the periphery defined by a long rectangular front face, a long rectangular rear face, and a pair of short rectangular side faces, the selector unit connected to the television, the source of closed captioning, a digital source of television signals, a magnetic tape source of television signals, and a free space source of television signals;

an array of language buttons situated on the top face of the selector unit and having indicia representative of one of the plurality foreign languages, each button adapted to allow the transmission of one of the sub-carrier channels to the television upon the depression thereof, whereby the language associated with the sub-carrier channel corresponds with the language represented by the indicia on the depressed button; and a display situated on the front face of the selector unit for depicting the indicia associated with the language button last depressed.

2. A multi-language closed captioning system comprising:

a television having a speaker for transmitting audio signals and a screen for depicting various images upon receipt of television signals and depicting alphanumeric characters upon the receipt of a sub-carrier channel;

a source of closed captioning adapted to deploy a plurality of sub-carrier channels each for transmitting a string of alphanumeric characters corresponding to the audio signals transmitted by the television with such alphanumeric characters representative of one of a plurality foreign languages;

a selector unit connected to the television and the source of closed captioning;

language buttons situated on the selector unit and adapted to allow the transmission of one of the sub-carrier channels to the television.

3. A multi-language closed captioning system as set forth in claim 2 wherein the buttons each have indicia representative of one of the plurality foreign languages situated thereon, whereby the language associated with the sub-carrier channel that is transmitted to the television corresponds with the language represented by the indicia on a depressed button.

4. A multi-language closed captioning system as set forth in claim 2 and further including a display situated on the front face of the selector unit for depicting an indicia associated with the language last chosen.

5. A multi-language closed captioning system as set forth in claim 2 wherein the source of closed captioning is remote.

* * * * *